(12) United States Patent
Ito et al.

(10) Patent No.: US 7,603,423 B2
(45) Date of Patent: Oct. 13, 2009

(54) COMMUNICATION SYSTEM WITH PRIMARY DEVICE AND STANDBY DEVICE TO PREVENT SUSPENSION OF SERVICE OF THE SYSTEM

(75) Inventors: Takayuki Ito, Hino (JP); Hidenori Miyamoto, Saitama (JP); Toru Nasu, Tokyo (JP); Shikiko Kawano, Funabashi (JP)

(73) Assignee: NTT DoCoMo, Inc., Tokyo (JP)

( * ) Notice: Subject to any disclaimer, the term of this patent is extended or adjusted under 35 U.S.C. 154(b) by 683 days.

(21) Appl. No.: 11/192,732

(22) Filed: Jul. 29, 2005

(65) Prior Publication Data
US 2006/0026250 A1    Feb. 2, 2006

(30) Foreign Application Priority Data
Jul. 30, 2004    (JP)    ............................. 2004-224006

(51) Int. Cl.
*G06F 15/16* (2006.01)
*H04L 12/28* (2006.01)

(52) U.S. Cl. ........................ 709/206; 370/219; 370/220; 700/82

(58) Field of Classification Search ................. 709/206; 370/219, 220; 700/82
See application file for complete search history.

(56) References Cited

U.S. PATENT DOCUMENTS

| | | | |
|---|---|---|---|
| 5,999,983 A * | 12/1999 | Ichimi et al. ................ 709/239 |
| 6,357,033 B1 | 3/2002 | Jippo | |
| 6,490,610 B1 * | 12/2002 | Rizvi et al. ................. 718/101 |
| 6,751,188 B1 | 6/2004 | Medved et al. | |
| 6,862,453 B2 * | 3/2005 | Collins ....................... 455/453 |
| 6,947,957 B1 * | 9/2005 | Lange ......................... 707/200 |
| 7,007,301 B2 * | 2/2006 | Crosbie et al. ................ 726/23 |
| 7,337,212 B2 * | 2/2008 | Goto ........................... 709/206 |
| 2001/0010060 A1 * | 7/2001 | Yu et al. ...................... 709/245 |
| 2002/0163910 A1 * | 11/2002 | Wisner et al. ............... 370/389 |
| 2003/0028587 A1 | 2/2003 | Driscoll et al. | |

(Continued)

FOREIGN PATENT DOCUMENTS

JP    H04-278732 A    10/1992

(Continued)

OTHER PUBLICATIONS

Australian Office Action, AU Pat. App. No. 2005203359, Oct. 12, 2006.

(Continued)

*Primary Examiner*—Alina Boutah
(74) *Attorney, Agent, or Firm*—Brinks Hofer Gilson & Lione (57) ABSTRACT

When a mail server 31 and a mail server 32 are in a failover state, switches 21, 22 select communication paths E, F. A temporary save server 50 stores email received from a mail reception server 10 during the failover in a disk storage 60, and after the completion of the failover, transmits to a mail server (e.g., mail server 32) that has been switched to function as a primary system an email stored in disk storage 60 and a write request for a disk storage 40. Mail server 32, upon receiving an email and a write request from temporary save server 50, stores the received email to disk storage 40 to update stored content.

7 Claims, 5 Drawing Sheets

U.S. PATENT DOCUMENTS

| | | | |
|---|---|---|---|
| 2003/0074411 A1* | 4/2003 | Nale | 709/206 |
| 2004/0243652 A1* | 12/2004 | Furuta | 707/204 |
| 2004/0243653 A1* | 12/2004 | Lee et al. | 707/204 |
| 2005/0010775 A1* | 1/2005 | Hsu | 713/176 |
| 2005/0102393 A1* | 5/2005 | Murray et al. | 709/224 |
| 2005/0114450 A1* | 5/2005 | DeVos | 709/206 |
| 2005/0238007 A1* | 10/2005 | Taylor et al. | 370/389 |
| 2006/0031323 A1* | 2/2006 | Johnson | 709/206 |

FOREIGN PATENT DOCUMENTS

| | | | |
|---|---|---|---|
| JP | H08-023334 A | 1/1996 |
| JP | H10-207802 A | 8/1998 |
| JP | H11-261663 A | 9/1999 |
| JP | 2000-250771 A | 9/2000 |
| JP | 2001-168899 A | 6/2001 |
| KR | 20010092554 | 10/2001 |
| KR | 20040013113 | 2/2004 |
| WO | WO 03/005247 A2 | 1/2003 |

OTHER PUBLICATIONS

Korean Office Action, KR Pat. App. No. 10-2005-0069432, Oct. 31, 2006.

* cited by examiner

| COMMAND (PROCEDURE) | REFERENCE DATA |
|---|---|
| WRITE COMMAND | MAIL DATA |
| READ COMMAND | DATA SPECIFYING MAIL |
| DELETE COMMAND | DATA SPECIFYING MAIL |
| SEARCH COMMAND | DATA SPECIFYING SCOPE OF SEARCH |
| ⋮ | ⋮ |

COMMUNICATION SYSTEM WITH PRIMARY DEVICE AND STANDBY DEVICE TO PREVENT SUSPENSION OF SERVICE OF THE SYSTEM

This application claims priority under 35 U.S.C. § 119 to Japanese Patent Application No. 2004-224006 filed Jul. 30, 2004, the entire content of which is hereby incorporated by reference.

TECHNICAL FIELD

The present invention relates to a technique for operating a communication system by which suspension of service of the system is avoided by using a standby device as an auxiliary to a primary device during operation of the system.

BACKGROUND

In a communication network for transmitting and receiving email, and in a mobile telephone network, for example, it is necessary to provide an uninterrupted service to users. To this end, there may be provided in such networks devices that duplicate the function of corresponding devices, and which are employed when a corresponding device fails or is required to be serviced. Such "duplicate" devices provided in a communication network consist of a pair of devices having an identical or almost identical function(s). When one of the pair of duplicate devices is in an operational state, the other duplicate device of the pair is in a standby state. In a case that the device in an operational state malfunctions or is the subject of a maintenance operation, the device in the standby state is made operational. Hereinafter, to differentiate such duplicate devices, a device in an operational state will be referred to as a "primary" device, and a device in a standby state will be referred to as an "auxiliary" device.

Various techniques have been proposed for use in a communication system such as a communication network for transmitting and receiving email in which primary and auxiliary devices are employed so as to avoid suspension of service. For example, Japanese Patent Application Laid-open Publications 2001-168899, H10-207802, and H04-278732 each disclose a technique for enabling short-time switching between a primary device and an auxiliary device (hereinafter, JP 2001-168899, JP H10-207802, JP H04-278732, respectively); and Japanese Patent Application Laid-open Publications 2000-250771, H11-261663, and H08-023334 each disclose a technique for switching between a primary device and an auxiliary device while avoiding interruption of service (hereinafter, JP 2000-250771, JP H11-261663, JP H08-023334, respectively).

In the technique disclosed in JP 2001-168899, JP H10-207802, and JP H04-278732, although a time required for switching between a primary device and an auxiliary device is kept short, it is not completely eliminated. Thus, for a certain amount of time during a switching period, processes in the communication network are unable to be carried out by either the primary or auxiliary device. In a case of a communication network which is an in-house LAN, the scale of the network is likely to be relatively small, and a volume of exchanged email is likely to be relatively small. However, in a case of a communication network operated by a carrier, for example, where a volume of exchanged email may amount to several hundred to several thousand mails per second, a time required for switching between a primary and auxiliary device may be as long as 2-3 minutes. This switching time is problematic in that it impedes functioning of a mail server of the network. This is particularly the case where, for example, a primary mail server which writes and reads email to/from a storage device is switched to an auxiliary device having the same function. In such a case, a large number of email for forwarding to the mail server will accumulate in a mail reception server provided upstream of the primary mail server and processing of this mail will therefore be delayed. There is also a danger that the mail reception server will be overloaded by the accumulation of mail, and consequently that during a switching period the mail reception server may be no longer able to receive any additional mail. A further problem exists in that to enable switching between a primary and auxiliary mail server, it is necessary for there to be kept available in the mail server a certain minimum amount of free memory.

The techniques disclosed in JP 2000-250771, JP H11-261663, JP H08-023334 enable switching between a primary device and an auxiliary device instantaneously without interruption. However, these techniques require that processes carried out by a primary device be constantly updated to an auxiliary device. Thus, it is necessary to frequently synchronize data between a primary device and an auxiliary device, which requires use of a communication system having a complicated configuration, and constant operation of the auxiliary device, which results in high operational costs.

The present invention has been envisaged in view of the problems described above, and has as its object a technique for switching between a primary and auxiliary device in such a way that avoids any interruption in a communication service, and which can be achieved by way of a simple configuration.

In one aspect, the present invention provides a communication system having two write devices for writing data into a storage device, wherein when one of the write devices is in an operational state the other of the write devices is in a standby state, and when data is received, the one of the write devices in the operational state writes the received data into the storage device, the communication system comprising: a transfer device; and a data save device, wherein the transfer device comprises: first receiving means for receiving data for the communication system; and transfer means for transferring to the data save device data received by the first receiving means during a switching period from commencement to completion of an operation for switching from one of the write devices in an operational state to the other in a standby state, the data being transferred to the write device in the operational state outside the write device switching period, wherein the data save device comprises: second receiving means for receiving data transferred from the transfer device; storage means for storing the data received by the second receiving means; and transmission means for transmitting, when the write device switching period is completed, the data stored in the storage means to the write device in the operational state.

According to the present invention, data transmitted to the communication system during a write device switching period is stored by the data save device, and the data is transmitted after completion of the write device switching period to a write device in an operational state, to be stored in the storage device.

In another aspect, the present invention provides a communication system having two management devices for managing data stored in a storage device, wherein when one of the management devices is in an operational state the other is in a standby state, and when process definition information defining details of a process to be performed for the data is received, the one of the management devices in the operational state executes the process according to the process definition information and then outputs a result of the process, the communication system comprising: a transfer device; and a data save device, wherein the transfer device comprises: first receiving means for receiving process definition information for the communication system; and transfer means for transferring the process definition information received by the first receiving means to the data save device during a switching period which lasts from commencement to completion of an operation for switching from one of the management devices in an operational state to the other of management devices in a standby state, the process definition information being transferred to the management device in the operational state outside the switching period, wherein the data save device comprises: second receiving means for receiving the process definition information transferred from the transfer device; storage means for storing the process definition information received by the second receiving means; and transmission means for transmitting, when the management device switching period is completed, the process definition information stored in the storage means to the management device in the operational state.

According to the present invention, process definition information transmitted to the communication system during a management device switching period is stored by the data save device, and after completion of the management device switching period, the data is transmitted to a management device in an operational state, to be processed.

In still another aspect, the present invention provides a communication system having a plurality of data write units, with each unit comprising two write devices for writing data into a storage device, wherein when one of the write devices is in an operational state the other is in a standby state, and when data is received, the one of the write devices in the operational state writes the received data into the storage device, the communication system comprising: a transfer device; a data save device; and detection means for detecting a data write unit that has started an operation for switching between the write device in the operational state and the write device in a standby state, wherein the transfer device comprises: first receiving means for receiving data for the data write unit detected by the detection means; and transfer means for transferring the data received by the first receiving means to the data save device during a switching period from commencement to completion of an operation for switching from one of the write devices in an operational state to the other in a standby state, the data being transferred to the write device in the operational state in the data write unit detected by the detection means outside the switching period, wherein the data save device comprises: second receiving means for receiving data transferred from the transfer device; storage means for storing the data received by the second receiving means; and transmission means for transmitting, when the write device switching period is completed, data stored in the storage means to the write device in the operational state in the data write unit detected by the detection means.

Further, the present invention provides a communication system having two mail servers, wherein when one of the mail servers is in an operational state the other is in a standby state, and when an email is received, the one of the mail servers in the operational state writes the received email into a storage device, the communication system comprising: a transfer device; and a data save device, wherein the transfer device comprises: first receiving means for receiving an email at the communication system; transfer means for transferring an email received by the first receiving means to the data save device during a period from commencement to completion of an operation for switching from one of the mail servers in an operational state to the other in a standby state, the email being transferred to the mail server that is in the operational state outside the mail server switching period, wherein the data save device comprises: second receiving means for receiving an email transferred from the transfer device; storage means for storing the email received by the second receiving means; and transmission means for transmitting, when the mail server switching period is completed, the email stored in the storage means to the mail server in the operational state.

Still further, the present invention provides a communication system having two mail servers, wherein when one of the mail servers is in an operational state the other is in a standby state, and when process definition information defining details of a process to be performed for an email is received, the one of the mail servers in the operational state executes a process according to the received process definition information and outputs a result of the process, the communication system comprising: a transfer device; and a data save device, wherein the transfer device comprises: first receiving means for receiving the process definition information for the communication system; transfer means for transferring the process definition information received by the first receiving means to the data save device during a period from commencement to completion of an operation for switching from one of the mail servers in an operational state to the other in a standby state, the process definition information being transferred to the mail server in the operational state outside the mail server switching period, wherein the data save device comprises: second receiving means for receiving the process definition information transferred from the transfer device; storage means for storing the process definition information received by the second receiving means; and transmission means for transmitting, when the mail server switching period is completed, the process definition information stored in the storage means to the mail server in the operational state.

According to the present invention, there is provided an exclusive save device for accumulating data transmitted to a communication system and process definition information during period when a device in an operational state and a device in a standby state are switched (device switching period), so that a communication system can be operated without interruption during a device switching period.

DETAILED DESCRIPTION OF THE DRAWINGS AND THE PRESENTLY PREFERRED EMBODIMENTS

Hereinafter, description will be given of an embodiment of the present invention with reference to the attached drawings. In the embodiment below, description will be given of a case where the present invention is applied to a communication network for transmitting and receiving email.

[A-1. Configuration of Embodiment]

Figure 1:
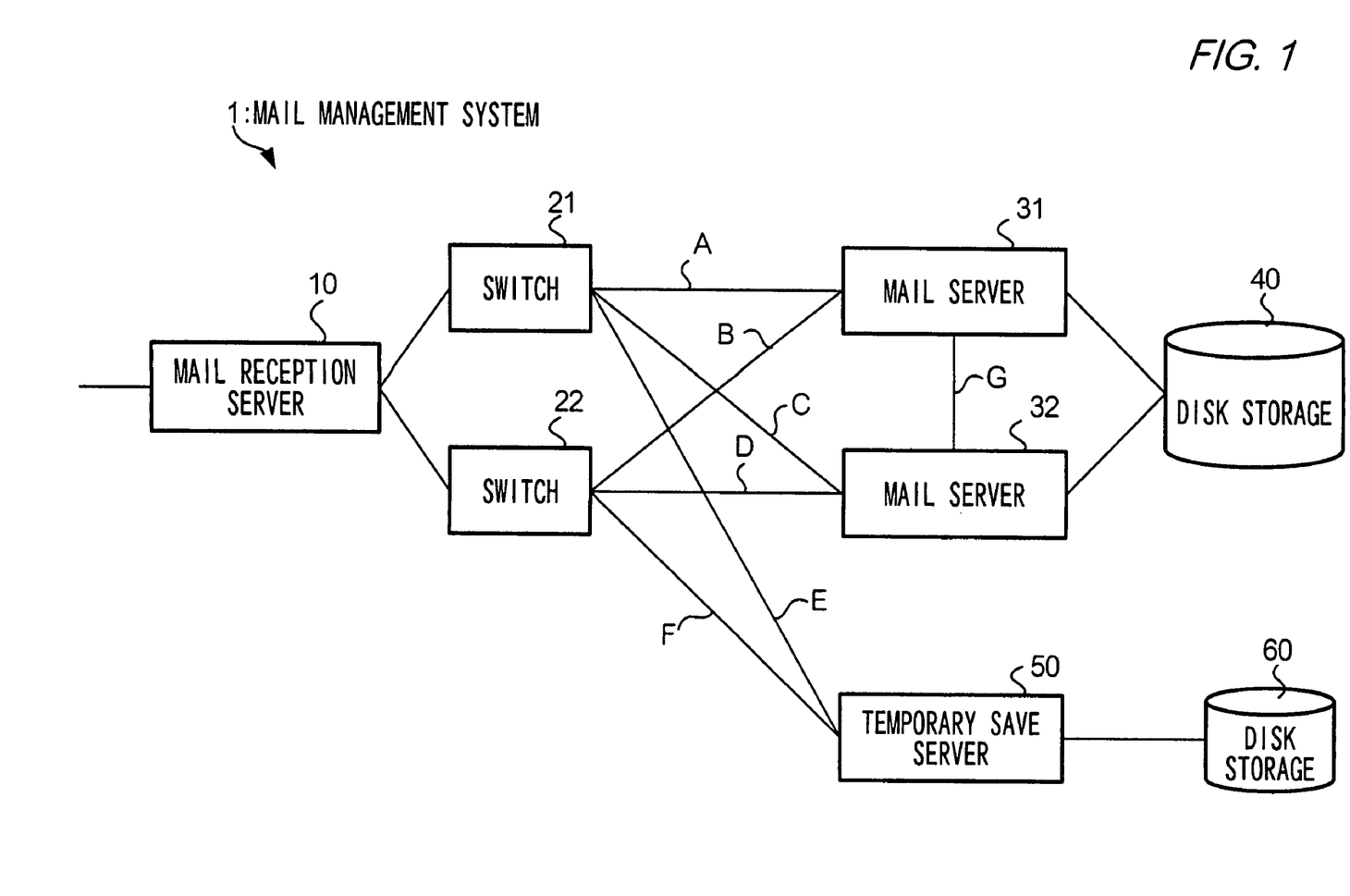
FIG. 1 is a block diagram showing an example of a mail management system 1 according to an embodiment of the present invention.

FIG. 1 is a block diagram showing a mail management system 1 (a communication system) according to an embodiment of the present invention. In the figure, email is accumulated in a disk storage 40. A mail server 31 and a mail server 32 have identical functions, and each, in response to a request from a mail reception server 10, performs the processes of writing, reading, deleting, retrieving, etc. of email from/into disk storage 40. One of mail server 31 and mail server 32 is used as a primary device while the other is used as an auxiliary device; during a period that a primary mail server is operated, the auxiliary mail server is in a standby state. A primary mail server is connected to an auxiliary mail server through a communication path G, and an auxiliary mail server monitors an operational state of a primary mail server through the communication path G. When the auxiliary mail server detects that, for example, a failure has occurred at the primary mail server, communication is performed via the communication path G between the primary mail server and the auxiliary mail server, through which communication the mail server in the operational state is switched from the main to the auxiliary mail server. Hereinafter, switching between the primary mail server and the auxiliary mail server will be referred to as a "failover."

A failover takes place not only due to failures such as malfunctioning of a device but also due to other factors such as a maintenance check on a primary mail server, and during switching at certain regular intervals between a primary and an auxiliary mail server. A key called a lock DISK is used in mail management system 1 to prevent both a primary mail server and an auxiliary mail server from accessing disk storage 40 concurrently with each other; and only a primary mail server having the lock DISK key is allowed to access disk storage 40. The lock DISK key is passed, at an instance of a failover, from a primary mail server to an auxiliary mail server via the communication path G.

Mail reception server 10 transmits, through switches 21, 22 to a primary mail server or a temporary save server 50, various processing requests for email received from a client terminal or another communication network (neither shown). Such processing requests can include an email along with a write request for instructing writing of the email, information specifying an electronic mail along with a read request for instructing reading of the email, information specifying an email along with a delete request for instructing deletion of the email, and a search request for searching for email along with information specifying the scope of the search.

Each of switches 21, 22 is a transfer device (network switch) for switching a communication path and transferring data received from mail reception server 10 to a primary mail server or to a temporary save server 50. Switches 21, 22 select the communication paths A, B in a case where a primary mail server is mail server 31, while selecting the communication paths C, D in a case where a primary mail server is mail server 32. When mail server 31 and mail server 32 are under failover, the communication paths E, F are selected.

In the present embodiment, mail reception server 10, during a period when mail server 31 and mail server 32 are under failover, transmits only a write request of an email from among various email processing requests, the write request containing data of an email and its write request. In other words, during failover, mail reception server 10 does not transmit information specifying an email, along with an email read or delete request, or a search request along with information specifying a scope of the search, and only transmits a write request. The other information, which is not transmitted, is accumulated in a memory within mail reception server 10 or in an exclusive disk storage (not shown) connected to mail reception server 10.

Temporary save server 50, in preparation for a failover performed by mail server 31 and mail server 32, is in a standby state such that an email and its write request can be accepted at any time from mail reception server 10. Temporary save server 50 accumulates in a disk storage 60 email received from mail reception server 10 during failover. Temporary save server 50, when the failover is completed, transmits to a mail server which has been switched to function as the primary system, email accumulated in disk storage 60 and write requests for disk storage 40. The primary mail server, upon receiving email and write requests from temporary save server 50, writes the received email into disk storage 40, thereby updating the content of disk storage 40.

Figure 2:
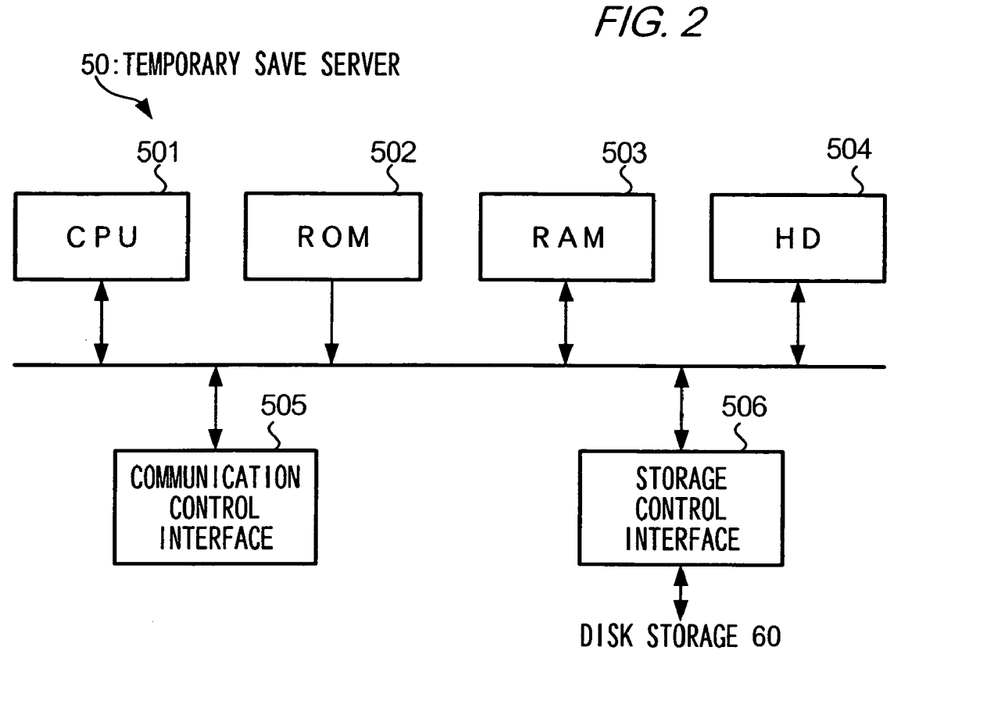
FIG. 2 is a block diagram showing an example of a hardware configuration of a temporary save server 50 according to the embodiment.

FIG. 2 is a block diagram showing an example of a hardware configuration of temporary save server 50. In the figure, CPU 501 executes a program stored in a ROM 502 or in a HD (hard disk) 504, to thereby control each unit of temporary save server 50. In ROM 502, there are stored a primary control program for controlling each unit of temporary save server 50 as well as other programs. A RAM 503 is used as a work area for CPU 501. HD 504 temporarily stores data such as email received from mail reception server 10. A communication control interface 505, under control of CPU 501, controls communication with mail reception server 10 or with mail servers 31, 32. Storage control interface 506, under control of CPU 501, controls write, read, and delete operations for email into/from disk storage 60.

Figure 3:
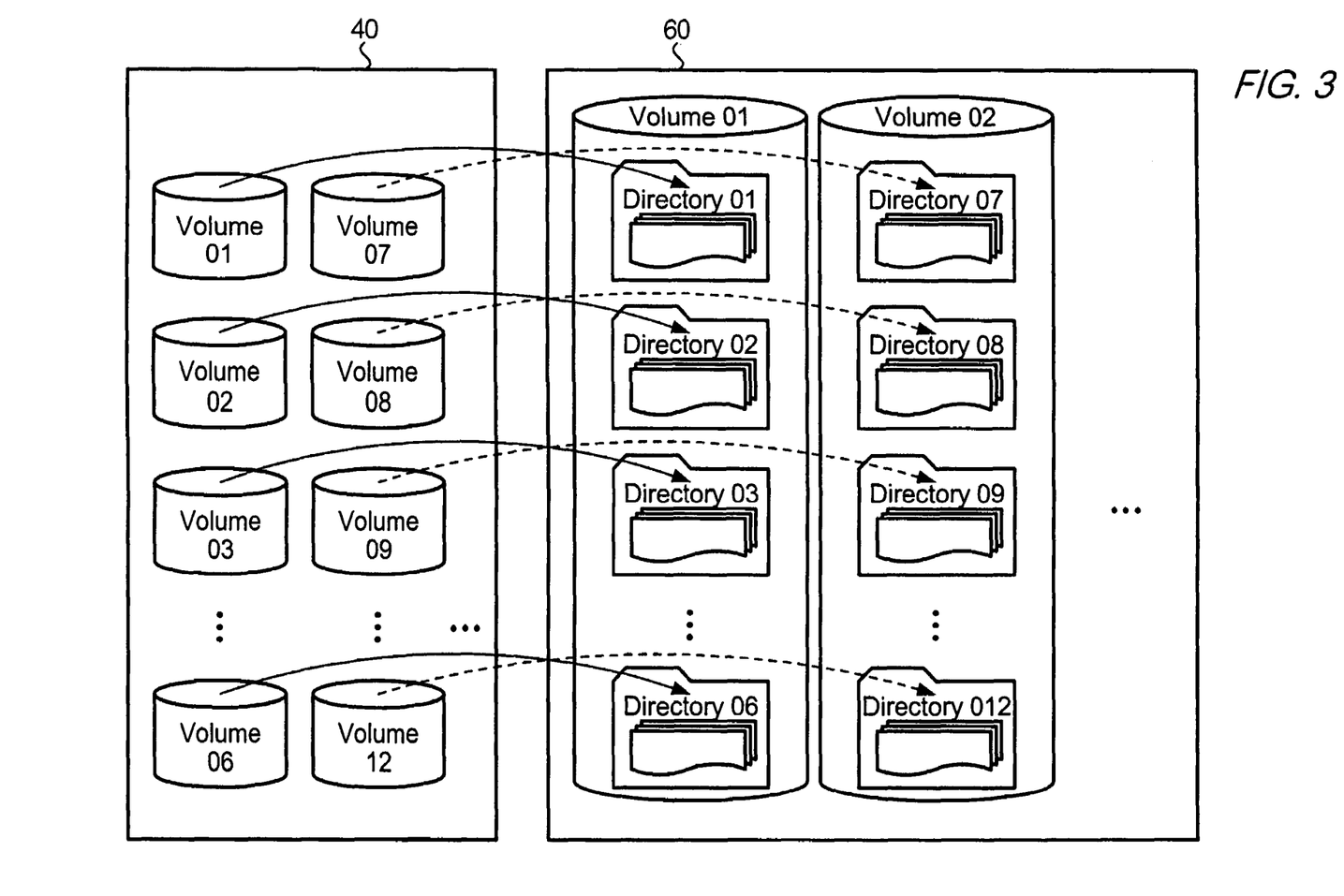
FIG. 3 is a diagram describing an example of a configuration of a memory area of disk storages 40, 60 according to the embodiment.

Disk storage 60 connected to temporary save server 50 is a storage device for temporarily storing email during a failover, and therefore, has a smaller capacity than that of disk storage 40, and consequently fewer disks are required for disk storage 60 than are required for disk storage 40. In disk storage 60, as shown in FIG. 3, there are provided a plurality of directories in one disk area (i.e., volume), each of the directories corresponding to each respective disk of disk storage 40, wherein a plurality of disks are provided. A storage area of disk storage 60 is thus associated with a storage area provided in disk storage 40, so that, after failover, when email stored in disk storage 60 is passed to and stored in disk storage 40, processing efficiency is enhanced.

[A-2. Operation of Embodiment]

Figure 4:
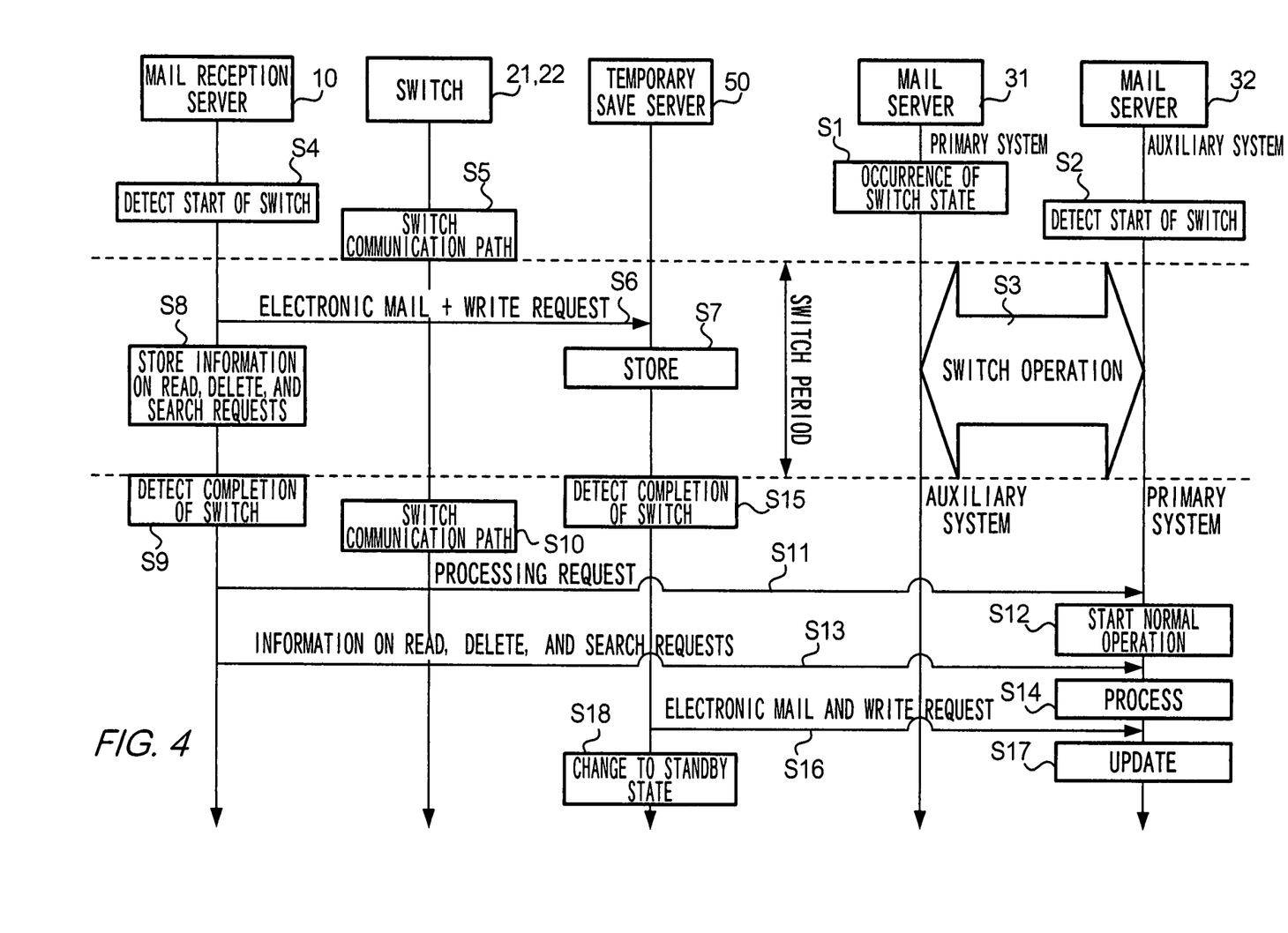
FIG. 4 is a sequence chart showing an example of an operation performed by each unit of mail management system 1 according to the embodiment.

FIG. 4 is a sequence chart showing an example of an operation performed by each unit of mail management system 1. For convenience, it is assumed that, in the initial stage, the primary mail server is mail server 31, the auxiliary mail server is mail server 32, and switches 21, 22 have selected the communication paths A, B.

Auxiliary mail server 32 monitors an operational state of primary mail server 31 via the communication path G. In a case that a switching state arises due to failure, maintenance checking, or regular switching, in which case the primary and auxiliary systems have to be switched (Step S1), auxiliary mail server 32 detects the switching state (Step S2). Communication is then performed between primary mail server 31 and auxiliary mail server 32 through the communication path G, and switching for changing a mail server in an operational state from mail server 31 to mail server 32 is performed (Step S3). The switching step includes, for example, delivery of a lock DISK key and transfer of a process in progress from mail server 31 to mail server 32.

Mail reception server 10 detects mail server 31 and mail server 32 as being in failover when error messages or timeout messages are returned in response to various processing requests for email transmitted to primary mail server 31 (Step S4). Mail reception server 10, upon detecting the failover, instructs switches 21, 22 to switch communication paths. As a result, switches 21, 22 select the data communication paths E, F, so as to switch the device to which data received from mail reception server 10 is transferred, from primary mail server 31 to temporary save server 50 (Step S5). Further, mail reception server 10 transmits a data receive request to temporary save server 50. As a result, temporary save server 50 is switched from a standby state to an operational state.

The switching step shown in Step S3 is subsequently performed, and until start of operation in mail server 32, which has been switched to function as a primary system, email received at mail reception server 10 from a client terminal or another communication network is accumulated in disk storage 60 by temporary save server 50. Specifically, mail reception server 10, from among various processing requests for an email received from a client terminal or another communication network, transmits, to temporary save server 50, only an email write request; i.e., an email and its write request (Step S6). Temporary save server 50, upon receiving an email write request from mail reception server 10, stores the email received in the request in disk storage 60 (Step S7).

Temporary save server 50, after storing the email received from mail reception server 10 in disk storage 60, returns a write completion message to a communication device which is the originator of the write request of the email. The write completion message is transferred via mail reception server 10 to the transmitter communication device. Thus, a transmitter communication device is able to transparently receive a write completion message even during a failover; namely, the message is received without any delay, as would be the case if the write operation had been completed in response to a normal email write request. In actuality, the email is not stored in disk storage 40 but is temporarily stored in disk storage 60.

Mail reception server 10, from among various processing requests for email received during the failover, does not transmit information specifying an email, read or delete requests for the email, or a search request for an email, or information specifying a scope of the search. Instead, this information is stored in a memory in mail reception server 10 or in an exclusive disk storage connected to mail reception server 10 (Step S8). Steps S6 to S8 are repeated until the switching step shown in Step S3 is completed, and until operation has started in mail server 32, which has been switched to function as a primary system.

Mail reception server 10 has a function of monitoring operational states in mail server 31 and mail server 32, and is thus able to detect completion of the switching step shown in Step S3, and start of operation in mail server 32, which has been switched to function as the primary system. Mail reception server 10, upon detecting that operation of mail server 32 has started (Step S9), first instructs switches 21, 22 to switch the communication path. As a result, switches 21, 22 select the communication paths C, D, and switch the device to which data received from mail reception server 10 is transferred, from temporary save server 50 to mail server 32 (Step S10).

Mail reception server 10 then starts a normal operation, and transmits to primary mail server 32 data relating to write, read, delete, and/or search requests of an email received from a client terminal or from another communication network (Step S11). Mail server 32, according to data relating to various processing requests of an email received from mail reception server 10, executes write, read, delete, and/or search operations (Step S12), and returns the results of the operations to a communication device which originated a processing request.

Mail reception server 10, in parallel with the normal operation shown in Step S11, transmits to mail server 32 data that was stored during the failover, i.e., data specifying an email and its read or delete request, and a search request of an email and information specifying a scope of the search (Step S13). Mail server 32 executes, according to information received from mail reception server 10, read, delete, and/or search operations of an email in parallel with the operation shown in Step S12 (Step S14), and transmits the result of the operation to a transmitter communication device.

Temporary save server 50, similarly to mail reception server 10, monitors operational states of mail server 31 and mail server 32, and has a detection function of detecting that the switching operation shown in Step S3 is completed and that the operation of mail server 32 that has been switched is started. Temporary save server 50, upon detecting that the operation of mail server 32 is started (Step S15), transmits to primary mail server 32 email stored in disk storage 60 during the failover, and a write request for disk storage 40 (Step S16). Mail server 32, upon receiving email and a write request from temporary save server 50, writes the received email into disk storage 40, to thereby update the stored content (Step S17). The processes of Steps S16 and S17 are performed in parallel with the above normal operation similarly to the processes of the above Steps S13 and S14. Temporary save server 50, after it completes transmitting all of the email stored in disk storage 60 to mail server 32, changes to a standby state to be prepared for a next failover (Step S18).

In the operation shown in FIG. 4, a normal operation is first started after the switching operation shown in Step S3 is completed, and the processes of Steps S13 and S14 and the processes of Steps S16 and S17 are performed concurrently with the normal operation. Alternatively, after the switching operation shown in Step S3 is completed, the processes of Steps S13 and S14 and the processes of Steps S16 and S17 may be first performed, and thereafter, the normal operation may be started. Further, the processes of Steps S13 and S14 and the processes of Steps S16 and S17 may be performed in reverse order, or even in parallel with each other.

As described in the foregoing, according to the present embodiment, during a period that mail server 31 and mail server 32 are in failover, switches 21, 22 select communication paths E, F, so that temporary save server 50 stores an email received from mail reception server 10 in disk storage 60. Temporary save server 50, after the completion of the failover, transmits to a mail server (e.g. mail server 32) that has been switched to a primary system, an email stored in disk storage 60 and a write request for disk storage 40. Mail server 32, upon receiving an email and a write request from temporary save server 50, writes the received email to disk storage 40 to update the stored content.

According to the present embodiment, from among various processing requests of an email received by mail reception server 10 during the failover, data relating to an email read request, delete request, and search request, but not for a write request, of an email are stored in mail reception server 10. Considering that the data amount of an email is considerably larger than the data amount of an email read request, delete request, and search request, only an email for which a write request has been made is stored in temporary save server 50. As a result, the amount of data to be stored in mail reception server 10 during the failover can be considerably reduced.

Thus, the load placed on mail reception server 10 in cases of failover can be lightened, to thereby prevent instances of delay in communication or instances where mail reception server 10 becomes no longer able to accept an email. Further, the capacity of an empty memory in mail reception server 10 can be reduced, which empty memory must be dedicated in preparation for instances of failover. Clearly, since no frequent synchronization of data is required between a primary mail server and an auxiliary mail server, only a simple configuration is needed, and also the operation cost can be reduced.

It may be envisioned to provide in each of a primary mail server and an auxiliary mail server a temporary save memory, and a process similar to that of temporary save server 50 may be performed using the temporary save memories. However, such a configuration is not viable since a part of data may disappear during the failover. Specifically, switching between a primary mail server and an auxiliary mail server is performed in two cases: one being when a failure such as malfunctioning has occurred at a primary mail server; and the other being when no failure has occurred at a primary mail server but switching is performed for a maintenance check or for regular switching, etc. In the latter case, a temporary save memory may be used at a primary mail server to perform the same process as temporary save server 50 in parallel with the switch operation shown in Step S3.

However, in the former case, since a failure has occurred at a primary mail server, performing the same process as temporary save server 50 using a temporary save memory is difficult in many cases. Further, even if a temporary save memory provided in an auxiliary mail server is used to perform the same process as temporary save server 50 in parallel with the switching operation, since the auxiliary mail server cannot be operated before the completion of the switching process, a part of data would disappear during the switching period. Moreover, a temporary save memory of the same storage capacity as that of disk storage 60 has to be provided in each of a primary mail server and an auxiliary mail server, which would result in increased costs for operating mail servers.

[B. Modification]

Figure 5:
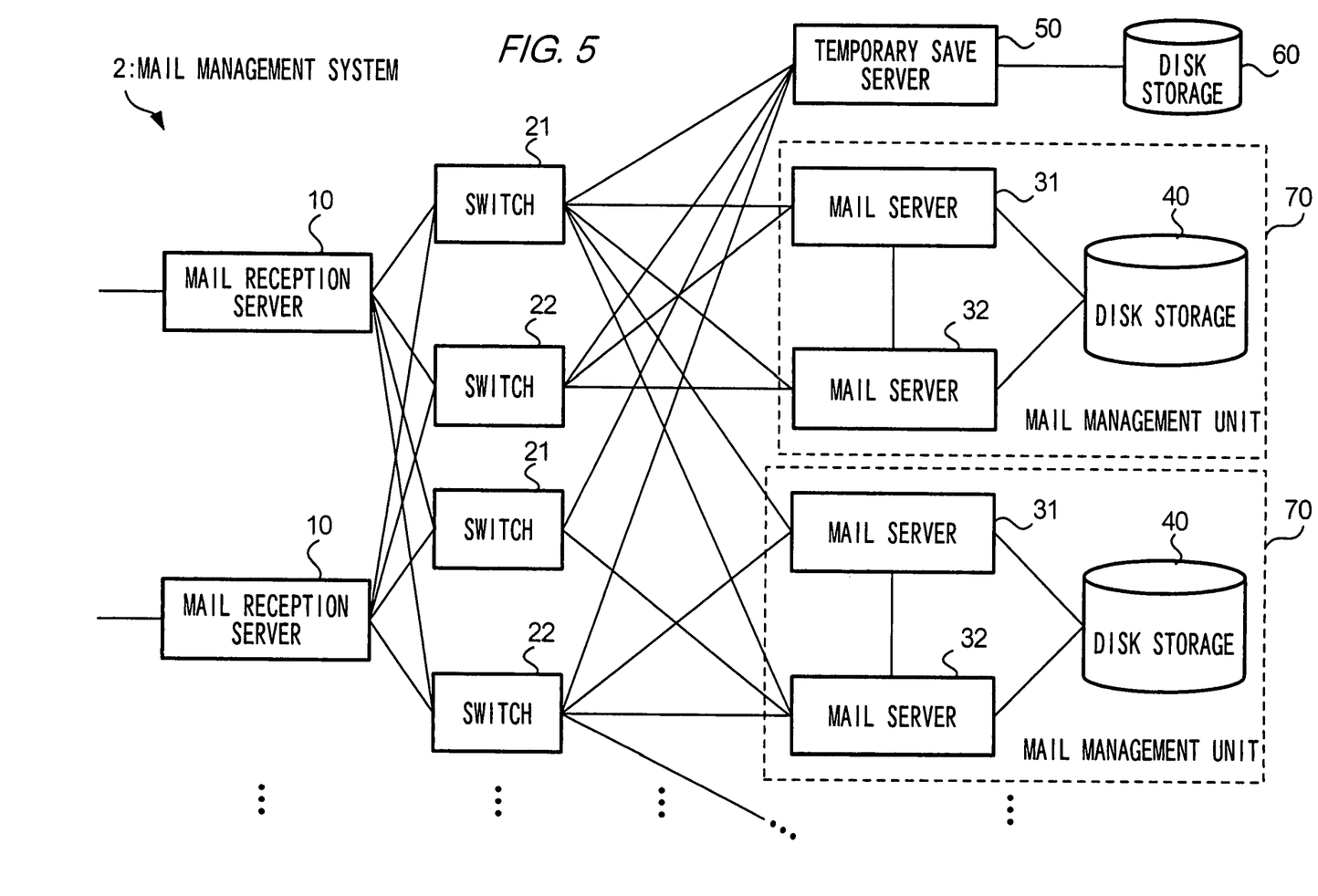
FIG. 5 is a block diagram showing an example of a configuration of a mail management system 2 according to a modification (1).

(1) In a mobile packet communication network serving mobile phones provided with a function of transmitting and receiving an email, in actuality, there are provided, as shown in FIG. 5, a plurality of mail management units 70 comprising two mail servers 31, 32 that are primary and auxiliary systems and one disk storage 40, and mail reception servers 10. In such a case, instead of providing, to each mail management unit 70, a temporary save server 50 and a disk storage 60, a single set of temporary save server 50 and disk storage 60 may be provided for a plurality of mail management units 70, as shown in the same figure.

In this case, temporary save server 50 has a function of detecting, from among a plurality of mail management units 70, a mail management unit 70 which switches between primary and auxiliary mail servers 31, 32. For the mail management unit 70 detected by the detection function, temporary save server 50 stores during the failover an email received from mail reception server 10 into disk storage 60, and after the failover, transmits the stored email to a primary mail server. The above detection function may be provided not with temporary save server 50 but with mail reception server 10 or switches 21, 22. The same effects as those of the above embodiment can be attained with the configuration according to the present modification, and further, since a temporary save server 50 and a disk storage 60 need not be provided for each mail management unit 70, the facility cost or operational cost can be reduced.

(2) In the above embodiment, mail reception server 10 transmits to temporary save server 50 an email and only its write request from among various processing requests of email received during the failover. However, mail reception server 10, during the failover, may also transmit to temporary save server 50 information relating to other requests than write requests, i.e., data specifying an email and its read or delete request for read and delete requests and a search request of an email and information specifying a scope of the search for a search request. In this case, temporary save server 50 stores data of read, delete, and/or search requests of an email into disk storage 60, and after the failover, transmits the data to a primary mail server. With such a configuration, the amount of data to be stored during the failover in mail reception server 10 can be further reduced.

Figure 6:
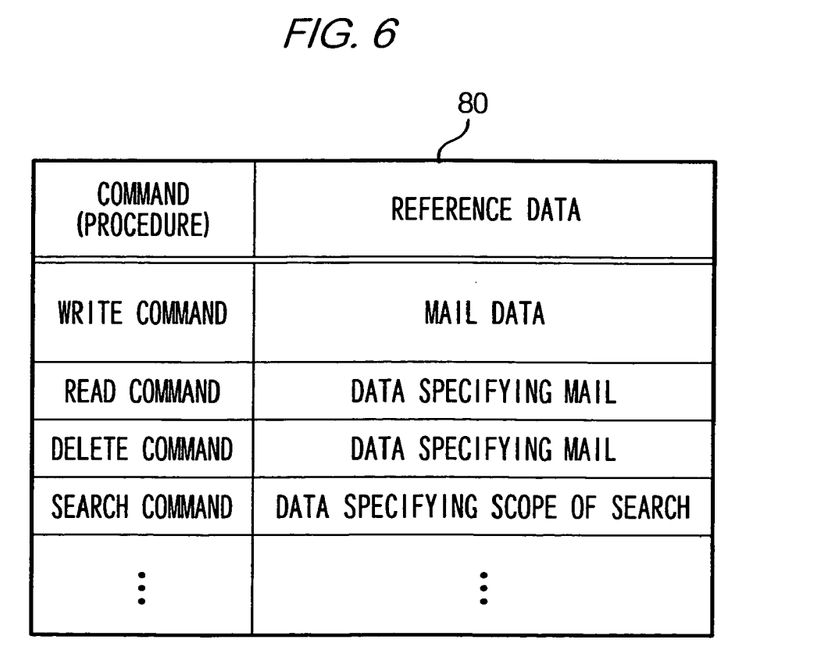
FIG. 6 relates to a modification (2) and is a diagram for describing a batch job 80 generated at a temporary save server 50.

Further, temporary save server 50 may, upon receiving various processing requests of an email from mail reception server 10, generate a batch job 80 for causing a primary mail server to execute a process corresponding to the received processing request (see FIG. 6), so that the generated batch job 80 is stored in disk storage 60. In this case, batch job 80 stored in disk storage 60 is transmitted after the failover to the primary mail server, and the primary mail server executes the received batch job 80, to thereby update stored content of disk storage 40 and perform read, delete, and/or search operations of an email. Batch job 80, as shown in FIG. 6, consists of a command indicating a type of a process to be executed (alternatively, a program code describing a procedure) and reference data to be referred to in executing the command. In a case where temporary save server 50 receives during the failover an email and its write request, a write command and the received email data are added to batch job 80. In a case where temporary save server 50 receives a read request of an electronic mail, a read command and mail identification data specifying an email to be read is added to batch job 80.

(3) HD 504 within temporary save server 50 may be used in place of disk storage 60. Further, disk storage 40 may be provided for each of mail server 31 and mail server 32. Disk storage 40 may be built into mail server 31 or mail server 32. The function of detecting the start and completion of the switching operation shown in Step 3 may be provided at temporary save server 50 or switches 21, 22. The present invention may be applied, as a system for managing an email, to the Internet, a mobile packet communication network, a public wireless LAN, and the like. Further, the present invention may be applied to, in addition to a mail management system, a data write system which has two write devices for writing data into a storage device, in which system one of the write devices is in an operational state while the other is in a standby state, and when data is received, the write device in an operational state is caused to write the received data into the storage device; and also to a data management system which has management devices for managing data stored in a storage device, in which system one of the management devices is in an operational state while the other is in a standby state, and when process definition information is received which provides details of a process for data stored in the storage device, the management device in an operational state is caused to execute the process according to the received process definition information and output the result of the process.

What is claimed is:

1. A communication system comprising:
two write devices configured to write data into a storage device, wherein when one of said write devices is in an operational state the other of said write devices is in a standby state, and when data is received at the communication system, the one of said write devices that is in the operational state writes the received data into said storage device:

a transfer device; and a data save device, wherein said transfer device comprises:

a first receiving device to receive data for said communication system; and a transfer apparatus to transfer said data received by said first receiving device to said data save device during a switching period lasting from commencement to completion of an operation for switching from one of said write devices that is in an operational state to the other of said write devices that is in a standby state, said data being transferred to said write device that is in said operational state at a time prior to said switching period or subsequent to said switching period, and said switching period being a period in which said two write devices are unavailable, wherein said data save device comprises:

a second receiving device to receive said data transferred from said transfer apparatus;

a storage device to store said data received by said second receiving device; and a transmission device to transmit, when said switching period is completed, said data stored in said storage device to said write device that is in said operational state.

2. The system of claim 1, wherein said data save device further comprises:

a reply device to, when said data received by said second receiving device is stored in said storage device, return a message to a communication device that has transmitted said data, said message indicating completion of a write operation.

3. A communication system comprising:

a plurality of data write units comprising two write devices for writing data into a storage device, wherein when one of said write devices is an operational state and the other of said write devices is in a standby state, and when data is received at the communication system, the one of said write devices that is in the operational state writes the received data into said storage device:

a transfer device; a data save device; and a detection device to detect a data write unit that has started an operation for switching between the one of said write devices that is in the operational state and the other of said write devices that is in the standby state, wherein said transfer device comprises:

a first receiving device for receiving data for said data write unit detected by said detection device; and a transfer apparatus to transfer said data received by said first receiving device to said data save device during a switching period lasting from commencement to completion of an operation for switching from one of said write devices that is in an operational state to the other of said write devices that is in a standby state, said data being transferred to said write device that is in said operational state in said data write unit detected by said detection device at a time prior to said switching period or subsequent to said switching period, said switching period being a period in which said one of said write devices and the other of said write devices are unavailable;

wherein said data save device comprises:

a second receiving device to receive data transferred from said transfer device;

a storage device to store said data received by said second receiving device; and a transmission device to transmit when said switching period is completed, data stored in said storage device to said write device that is in said operational state in said data write unit detected by said detection device.

4. A communication system comprising:

two management devices for managing data stored in a storage device, wherein when one of said management devices is in an operational state the other of said management devices is in a standby state, and when process definition information is received, the process definition information defining details of a process to be performed for said data the one of said management devices that is in the operational state is caused to execute said process according to said process definition information and to transmit information about a result of said process, a transfer device; and a data save device, wherein said transfer device comprises:

a first receiving device to receive said process definition information for said communication system; and a transfer apparatus to transfer said process definition information received by said first receiving device, to said data save device during a switching period lasting from commencement to completion of an operation for switching from one of said management devices that is an operational state to the other of said management devices that is in a standby state, said process definition information being transferred to said management device that is in said operational state at a time said prior to said switching period or subsequent to said switching period, said switching period being a period in which said management devices are unavailable, wherein said data save device comprises:

a second receiving device to receive said process definition information transferred from said transfer device;

storage device for storing said process definition information received by said second receiving device; and a transmission device to transmit when said switching period is completed, said process definition information stored in said storage device to said management device that is in said operational state.

5. The system of claim 4, wherein said process definition information contains information specifying data to be processed from among data stored in said storage device.

6. A communication system comprising: two mail servers, wherein when one of said mail servers is in an operational state the other is in a standby state, and when an email is received at the communication system, the one of said mail servers that is in the operational state writes the received email into a storage device, a transfer device; and a data save device, wherein said transfer device comprises:

a first receiving device to receive an email for said communication system;

a transfer apparatus to transfer an email received by said first receiving device mea~, to said data save device during a switching period lasting from commencement to completion of an operation for switching from one of said mail servers that is in an operational state to the other of said mail servers that is in a standby state, said email being transferred to said mail server that is in said operational state at a time prior to said switching period or subsequent to said switching period, said switching period being a period in which said mail servers are unavailable wherein said data save device comprises:

a second receiving device receiving an email transferred from said transfer device;

a storage device to store said email received by said second receiving device; and a transmission device to transmit, when said switching period is completed, the email stored in said storage device to said mail server that is in said operational state.

7. A communication system comprising:

two mail servers, wherein when one of said mail servers is in an operational state and the other of said mail servers is in a standby state, and when process definition information is received, the process definition information defining details of a process to be performed for an email is received, the one of said mail servers that is in the operational state executes a process according to the received process definition information and transmits information about a result of said process, a transfer device; and a data save device, wherein said transfer device comprises:

a first receiving device to receive said process definition information for said communication system;

a transfer apparatus to transfer said process definition information received by said first receiving device to said data save device during a switching period from commencement to completion of an operation for switching from one of said mail servers that is in an operational state to the other of said mail servers that is in a standby state, said process definition information being transferred to said mail server that is in said operational state at a time prior to said switching period or subsequent to said switching period, said switching period being a period in which said mail servers are unavailable, wherein said data save device comprises:

a second receiving device to receive said process definition information transferred from said transfer device;

a storage device to store said process definition information received by said second receiving device; and a transmission device to transmit when said switching period is completed, said process definition information stored in said storage device to said mail server that is in said operational state.

* * * * *

UNITED STATES PATENT AND TRADEMARK OFFICE
CERTIFICATE OF CORRECTION

PATENT NO.      : 7,603,423 B2                                          Page 1 of 1
APPLICATION NO. : 11/192732
DATED           : October 13, 2009
INVENTOR(S)     : Ito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Fifth Day of October, 2010

David J. Kappos
*Director of the United States Patent and Trademark Office*